MAGNETIC TAPE RECORDING HEAD
Filed Dec. 11, 1957
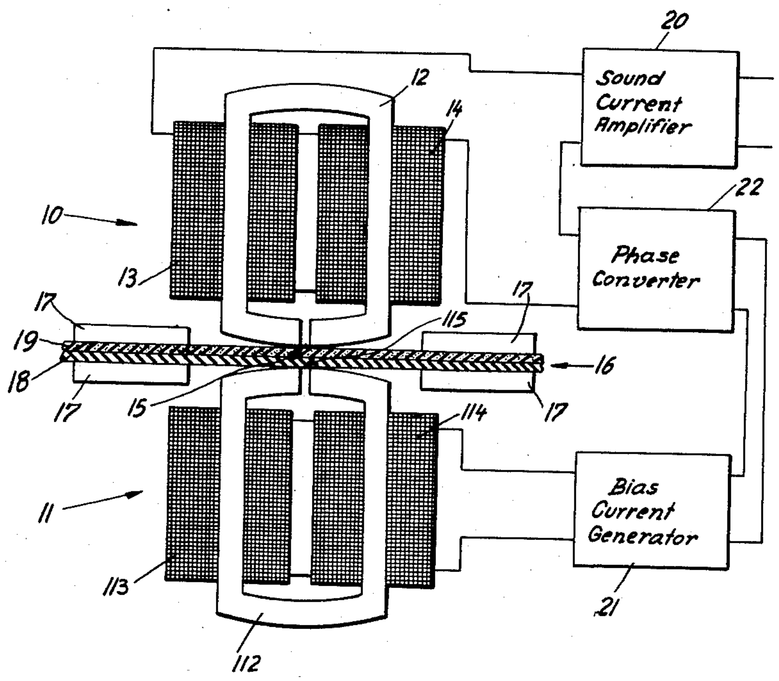
Inventors:
Wolfgang Bogen and Wolfgang Steinkopf.

United States Patent Office 2,932,697
Patented Apr. 12, 1960

2,932,697

MAGNETIC TAPE RECORDING HEAD

Wolfgang Bogen and Wolfgang Steinkopf, Berlin-Lichterfelde, Germany

Application December 11, 1957, Serial No. 702,197

Claims priority, application Germany December 14, 1956

6 Claims. (Cl. 179—100.2)

Our invention relates to an improved magnetic tape recorder.

In the conventional method of recording sound on magnetizable tape the tape is fed past the gap of a single flux circuit formed by the core of an electromagnet. Most of the flux passes through the opposed pole faces constituting the gap but some of the flux extends externally of the gap through the tape fed across the outside of the electromagnet past the gap. The flux is produced by the audio current representing the sound to be produced and by an alternating bias current of supersonic frequency that is superimposed on the audio current. The portion of the flux extending externally of the gap through the tape magnetizes same remanently thus producing the recorded sound signals therein.

The supersonic bias current is so adjusted that the remanent magnetism in the tape will have the largest possible contrast expansion with a minimum distortion factor.

Experience has shown that when the supersonic bias current exceeds a certain limit, the record of the higher audio frequencies will be adversely affected. In other words, the audio frequency characteristic largely depends on the supersonic bias. When the bias is so chosen as to result in a perfect record of the longer audio wave lengths, the response of the recording system to short-wave length will suffer and will drop as the wave length decreases. This may be explained by the fact that externally of the gap the supersonic bias current produces a field which in the surface stratum of the tape contacting the recording magnet is of particular intensity. The short-wave lengths of the sound, however, are recorded in such surface stratum only. Therefore, the record of the high audio frequencies is liable to be erased by the bias current in the surface stratum of the tape. This erasing effect causes the frequency characteristic to drop for the higher audio frequency.

It is an object of our invention to provide an improved method of recording sound on magnetizable tape in which this erasing effect of the bias current on the record of the higher audio frequency is minimized or avoided altogether.

It is another object of our invention to provide an improved method of recording sound on magnetizable tape that affords a higher fidelity with a reduced velocity of the tape.

Another object of our invention is to provide an improved recording method in which enough bias may be applied to excite the magnetic layer of the tape throughout most of its thickness for recording low audio frequencies without distortion without, however, any substantial erasure of the record of the high audio frequencies.

A further object of our invention is to provide an improved recording head capable of operation in accordance with our improved method.

Our invention will now be explained with reference to the accompanying drawing in which a preferred example of our improved recording head is more or less diagrammatically illustrated. We wish it to be clearly understood, however, that our invention is in no way limited to the details of such example but is capable of numerous modifications within the scope of the appended claims and that the terms and phrases used in such detailed description have been chosen for the purpose of illustrating the invention rather than that of restricting or limiting same.

In the drawing a cross section through our novel magnetic tape recording head is shown. The recording head comprises a primary magnet 10 and a secondary magnet 11, each magnet consisting of a core 12, or 112 respectively, constituting a flux circuit and of coils 13, 14, and 113, 114 respectively, mounted on the core. Each core 12, or 112 respectively, is provided with a recording gap 15, or 115 respectively. The magnets 10 and 11 are disposed in spaced relationship with their recording gaps 15 and 115 disposed in opposed registering relationship. Suitable means are provided for feeding and guiding a magnetic tape 16 through the space between the magnets 10 and 11 past the gaps 15 and 115. As such means are well known in the art, they have not been shown and described in detail herein. The guiding means are diagrammatically indicated at 17, however.

The tape 16 is composed of a base layer 18 and of a magnetic layer 19 fixed thereon. Preferably, magnet 10 is mounted in contact with the layer 19, whereas the distance of magnet 11 from the tape is reduced to a minimum. Preferably, the core 12 of the primary magnet 10 has a structure resulting in higher high frequency losses than the structure of the core 112 of the secondary magnet 11. Thus, both of the cores 12 and 112 may be of the conventional laminar structure. In this event, the lamellae of the core 12 may be thicker than those of the core 112.

Preferably, the gap 15 has a width of .001–.002 mm., while the width of the gap 115 may be larger amounting up to substantially 0.010 mm.

Our novel recording head may be used to practice our improved recording method as follows:

The audio current representing the sound to be recorded is supplied in the conventional manner by a sound current amplifier diagrammatically indicated at 20. As such amplifiers are well known in the art, a detailed description thereof is deemed dispensable herewith. The supersonic bias current having preferably a frequency five to ten times the highest audio frequency to be recorded is produced by a bias current generator diagrammatically indicated at 21. As such generators are well known in the art, a detailed description thereof is deemed dispensable herewith. This generator is provided with two outputs, one connected to the coils 113 and 114 for the purpose of energizing the circuit formed by core 112 with the electric bias current of a supersonic frequency. The other output of the generator 21 is connected to the input of a phase converter diagrammatically indicated at 22. Since such phase converters are well known in the art, a detailed description thereof is deemed dispensable herewith. The sole function of this converter is to produce a current having the same frequency as the output of generator 21 but the opposite phase. The output of the phase converter 22 is arranged in series with the output of the sound current amplifier 20 and with the coils 13 and 14 of the primary magnet 10.

Hence, it will appear that the primary circuit formed by the core 12 of the primary magnet 10 is energized with both the audio current supplied by the amplifier 20 and with a compensating current having the supersonic frequency of the generator 21 but being of a phase opposite to that of said bias current. It is the purpose of this compensating current to counteract the inductive effect of the magnet 11 upon the magnet 10. In other words, the output of the converter 22 is so chosen that the supersonic voltage induced by the magnet 11 in the magnet 10 will be reduced to a minimum. Consequently, the primary flux produced in the circuit 12 is primarily a function of the audio current representing the sound to be recorded.

From the foregoing it will appear that our novel recording method comprises the steps of producing a primary flux in the circuit 12 by energization with the audio current and simultaneously producing a secondary flux in the circuit 112 by energization with the electric bias current of supersonic frequency produced by generator 21. Preferably, the primary circuit 12 is energized with both the audio current and the compensating current supplied by the output of converter 22. This compensating current has the supersonic frequency of generator 21 but is of a phase opposite to that of the bias current to counteract the inductive effect of the bias current on the primary flux circuit 12.

The bias current supplied to the coils 113 and 114 of the secondary magnet 11 is so controlled as to reduce its magnetizing effect upon the surface stratum of layer 19 adjacent the primary flux circuit constituted by core 12 to the most favourable degree. As a result, the erasure effect of the supersonic bias field externally of the gap 115 upon the record of the short audio waves produced in the surface stratum of the magnetizable layer 19 will be minimized or eliminated altogether. Nevertheless, the bias field extending externally of the gap 115 and having a strength dropping within the layer 19 with increased distance from the magnet 11 will be sufficiently intense to excite the layer 19 substantially through its entire thickness in a manner affording the condition required for a distortionless recording of the long audio waves by the field extending externally of the gap 15 and produced by the primary magnet 10. Preferably, the output current of the phase converter 22 is controlled in dependence on the bias flux produced in the primary circuit 12 by the inductive effect produced by the bias magnet 11.

We have found that with a magnetic tape having a magnetic layer 19 of a thickness of .010 to .015 mm. and a velocity of 4.75 cm. per second the audio frequency characteristic is practically constant between 30 and 18,000 cycles and is far superior to the conventional recording methods using a tape velocity of 9.5 cm. per second. This superiority is reflected by the reduced loss at 18 kilo-cycles, the reduction of such loss amounting to at least 15 db, while the distortion factor is minimized and the contrast expansion is a maximum.

Our invention is equally applicable to the recording of television signals on magnetizable tape.

Another advantage of our improved method is a reduction of the noise that will be heard when high audio frequencies are played back with a low tape velocity. Also noises are reduced occurring when medium audio frequencies are played back at full volume.

From the above explanations it will be understood that in accordance with our improved recording method the drop of the supersonic frequency bias experienced in the conventional recording method within the magnetic layer 19 with increasing distance from the recording gap is largely compensated by the provision of the second magnet 11. The supersonic bias field in the layer 19 is primarily produced by the secondary magnet 11 mounted in opposed relationship to the audio magnet 10 and in part by the supersonic voltage induced in the coils 13 and 14 by the magnet 11. In this operation, the bias is so divided up between the two magnets as to afford the most favourable conditions for recording long audio wave lengths with the greatest possible contrast expansion. The sensitivity of the layer 19 to short audio wave lengths resulting in a record being a small fraction of the thickness of the layer 19 is largely determined by the bias field produced directly in front of gap 15. With the aid of our method the best possible bias can be set up for any audio wave length to be recorded. In this manner the erasure of the record of short audio wave lengths by the supersonic bias field is minimized. In order to ensure that the bias field in front of the gap 15 does not exceed the desired intensity, the induction of a bias voltage in the coils 13 and 14 of the audio magnet 10 is minimized by energization of this magnet with the compensating current produced by the phase converter 22. This compensating current will influence the magnetic field induced by the magnet 11 in the coils 10 and 14 sufficiently to reduce the bias directly in front of the gap 15 to the best possible value.

Preferably, the gap 115 of the bias magnet 11 should be rather narrow, for instance of the order of .010 mm. We have found that with a greater width of the gap 115 an excessive number of stray lines of force issuing from the gap 115 will enter the core 12 at the right and at the left of the gap 15, whereas with a much smaller width of the gap 115 the bias field within the layer 19 will lack the required intensity.

Moreover, it will be readily understood that the distance of the two cores 12 and 112 from each other has a considerable influence upon the distribution of the bias field between the two cores. The smaller such distance is chosen, the more narrow may be the gap 115 of the bias magnet 11 since the required output of the bias magnet drops.

Preferably, the magnets 10 and 11 are adjustably mounted on a common bracket in stationary condition. If the bias magnet 11 would be resiliently held in contact with the supporting layer 18 of the tape it would be lifted during passage of any tape joint where two lengths of tape are fixed to each other in overlapping relationship and such intermittent movement of the magnet 11 would be highly undesirable.

However, even with a stationary mounting of both magnets 10 and 11, the distance of the bias gap 115 from the magnetizable layer 19 would be subject to a gradual increase owing to the wear of the magnet core 12 by friction with the tape 16. Therefore, we prefer to control the compensating current in dependence on the bias voltage induced in the coils 13 and 14. Electronic means for effecting such control are well known in the art and, therefore, need not be described in detail. It will suffice to mention that means may be provided to rectify the bias voltage induced by the magnet 11 in the coils 10 and 14 and to feed the control voltage so obtained to electronic means controlling the output or outputs of the generator 21. Alternatively, the rectified voltage may directly control the generator 21.

The distribution of the bias field between the two cores 12 and 112 may be also controlled by the choice of suitable structure for the magnetic cores 12 and 112. Preferably, the core 12 has a structure enabling the audio magnet 10 to be energized with the highest audio frequencies to be recorded with a satisfactory efficiency. For this purpose the resonance frequency of the coils 13 and 14 may be so chosen as to coincide with the highest audio frequency to be recorded. The frequency of the supersonic bias current is so chosen that the bias flux induced in the audio magnet 10 owing to the losses in the core 12 is reduced to the desirable amount causing the bias field in front of the gap 15 to have the desired intensity. Owing to the choice of a suitable structure, however, the losses of the flux suffered in the core 112 is negligeable. This core will be energized with a high supersonic frequency current. The structure of the core 12, however, results in a much higher dampening of the bias frequency. The thickness of its lamellae is so chosen that the losses of the audio frequency flux of the highest frequencies to be registered are still tolerable.

The example of our invention described hereinabove with reference to the drawing is capable of numerous modifications. Thus, we may energize magnet 10 with a bias current having a supersonic frequency differing from that of the current energizing mgnet 11. More particularly, the frequency of the bias current energizing the audio magnet 10 may amount to 100 kc., whereas the frequency of the bias current energizing magnet 11 is ten times as high. As a result, the field produced by the bias magnet 11 will enter into the audio magnet 10 to a negligeable extent only and in front of the gap 15 will have an intensity reduced to the desired degree. The adjustment of the most favourable bias energization is effected in the manner described heretofore.

It has been mentioned hereinabove that the gaps 15 and 115 of the two magnets 10 and 11 should be disposed in accurate parallel relationship in order to ensure the most desirable distribution of the bias field throughout the magnetizable layer 19. The proper adjustment of the magnet 11 may be facilitated by measuring the voltage induced by the magnet 11 in the coils 13 and 14 and by displacing the magnet 11 in a translatory and a pivotal manner until the induced voltage is a maximum. The distance of the cores 12 and 112 must be so chosen as to afford easy passage to the joints of tapes of the largest thickness that are to be used for the recording purpose.

In lieu of an alternating current of supersonic frequency, a direct current may be used to energize the magnets 10 and 11 for the purpose of producing the bias field. This modification of our invention is of particular value for recording signals of extremely high frequencies, such as television signals. If desirable, the bias field may be produced by combined direct and alternating currents.

Compared with the conventional recording method using a single recording magnet energized by both the audio current and the bias current of supersonic frequency, our invention offers the following advantages:

The distribution of the bias field throughout the thickness of the magnetizable layer 19 may be readily so adjusted as to afford the best possible conditions for recording both low audio frequencies and high audio frequencies. As the erasure effect upon the record in the surface stratum of the layer 19 is avoided, the apparent zero position displacement on playback is avoided. With the same contrast expansion and the same frequency characteristic the velocity of the tape can be reduced by more than 50%. In fact, with a width of gap 15 of .001 mm. and with a tape velocity of 4.75 cm. per second our improved recording head when used for both the recording and the playback, affords a possibility of recording and reproducing audio frequencies from 20 to 18,000 cycles per sceond with perfect fidelity. The noise voltage produced with said velocity by the motion of the tape is in the same order as that produced at a tape velocity of 9.5 cm. per second with the conventional recording method. When the tape velocity is reduced to 2.4 cm. per second a substantially constant frequency characteristic up to 15,000 cycles per second is obtainable with a reduced contrast expansion.

The magnet 10 may be of a type having a high ohmic resistance and resulting in a resonance frequency of the same order as the highest audio frequencies to be recorded. This affords the advantage that with the low tape velocities stated high audio frequencies may be recorded without impairing the record of audio waves of great lengths.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. Magnetic tape recorder comprising a primary magnet and a secondary magnet, each magnet consisting of a core constituting a flux circuit and being provided with a recording gap and of at least one coil on said core, said magnets being disposed in spaced relationship with their recording gaps disposed in opposed registering relationship, means for guiding a magnetic tape through the space between said magnets past said gaps, means for energizing said primary magnet with an electric current representing the impulses to be recorded, a generator producing an electric bias current and constituting a first source, phase converting means having an input connected to said generator and having an output constituting a second source, said sources supplying a bias frequency of opposite phase, energizing means connected with one of said sources for energizing said secondary magnet, and energizing means connected to the other one of said sources for energizing said primary magnet.

2. Magnetic tape recorder claimed in claim 1 further comprising means for adjusting said energizing means.

3. Magnetic tape recorder as claimed in claim 1 in which the core of said primary magnet has a structure entailing higher eddy-current losses than the structure of the core of said secondary magnet.

4. Magnetic tape recorder as claimed in claim 1 in which said energizing means are so relatively proportioned as to minimize the erasing effect of the resultant bias field upon high frequency records in the surface stratum of said tape adjacent said primary flux circuit and as to produce a normal bias field in the other strata of said tape.

5. Recording head claimed in claim 1 in which the recording gap of said secondary magnet is wider than the recording gap of said primary magnet.

6. Recording head claimed in claim 1 in which both of said magnets are mounted at a distance slightly exceeding the maximum thickness of said tape.

References Cited in the file of this patent

UNITED STATES PATENTS

| | | |
|---|---|---|
| 2,484,568 | Howell | Oct. 11, 1949 |
| 2,628,285 | Camras | Feb. 10, 1953 |
| 2,675,429 | Rohling | Apr. 13, 1954 |

FOREIGN PATENTS

| | | |
|---|---|---|
| 173,869 | Austria | Feb. 10, 1953 |